(12) United States Patent
Nagasawa et al.

(10) Patent No.: US 7,579,191 B2
(45) Date of Patent: Aug. 25, 2009

(54) REACTION METHOD USING MICROREACTOR

(75) Inventors: Hideharu Nagasawa, Minami-Ashigara (JP); Kazuhiro Mae, Kyoto (JP)

(73) Assignee: FUJIFILM Corporation, Tokyo (JP)

( * ) Notice: Subject to any disclaimer, the term of this patent is extended or adjusted under 35 U.S.C. 154(b) by 743 days.

(21) Appl. No.: 10/854,805

(22) Filed: May 27, 2004

(65) Prior Publication Data
US 2005/0036921 A1 Feb. 17, 2005

(30) Foreign Application Priority Data

May 30, 2003 (JP) ............................. 2003-154404
Jul. 1, 2003 (JP) ............................. 2003-189657

(51) Int. Cl.
G01N 35/08 (2006.01)
B01F 15/00 (2006.01)
B01L 3/02 (2006.01)
G01N 35/00 (2006.01)

(52) U.S. Cl. ........................ 436/52; 366/167.1; 422/99; 422/100; 436/43

(58) Field of Classification Search ................... 436/52; 366/167.1
See application file for complete search history.

(56) References Cited

U.S. PATENT DOCUMENTS

| 6,225,497 | B1 | 5/2001 | Becker et al. | |
| 6,838,232 | B2 * | 1/2005 | Nagasawa et al. | ........... 430/449 |
| 2001/0050881 | A1 * | 12/2001 | Depaoli et al. | ........... 366/167.1 |
| 2003/0190563 | A1 * | 10/2003 | Nagasawa et al. | ........... 430/569 |

FOREIGN PATENT DOCUMENTS

| DE | 19541266 A1 | 5/1997 |
| DE | 10148615 A1 | 4/2003 |
| EP | 1 329 765 A2 | 7/2003 |
| JP | 6-186656 A | 7/1994 |
| JP | 6-226085 A | 8/1994 |
| JP | 20021102 | 1/2002 |
| JP | 2002-282682 A | 10/2002 |
| JP | 2002292274 | 10/2002 |
| JP | 2003-502144 A | 1/2003 |
| WO | WO 00/62913 A1 | 10/2000 |
| WO | WO 00/78438 A1 | 12/2000 |

OTHER PUBLICATIONS

Guangwen, Chen et al.: "Techniques of Micro-Chemical Industry", <J. Chem. Ind.>, Apr. 2003, vol. 53, Quarter 4, p. 429, Table 1.
Japanese Office Action dated Apr. 11, 2008 with a complete English language translation.

* cited by examiner

*Primary Examiner*—Jill Warden
*Assistant Examiner*—Neil Turk
(74) *Attorney, Agent, or Firm*—Sughrue Mion, PLLC

(57) ABSTRACT

In a reaction caused by using a microreactor which provides a plurality of supply routes in communication with one reaction channel as a multicylindrical structure having a co-axis and causes a plurality of fluids L1, L2, L3 to flow together in the reaction channel via the respective fluid supply routes, whereby these fluids L1, L2, L3 are coaxially laminated and caused to flow as laminar flows whose sections orthogonal to the co-axis are annular and the fluids are diffused together in a normal direction of contact interfaces thereof to cause the reaction, among the plurality of laminated fluids L1, L2, L3, at least one fluid is constituted by a fluid not participating in the reaction of other fluids.

9 Claims, 9 Drawing Sheets

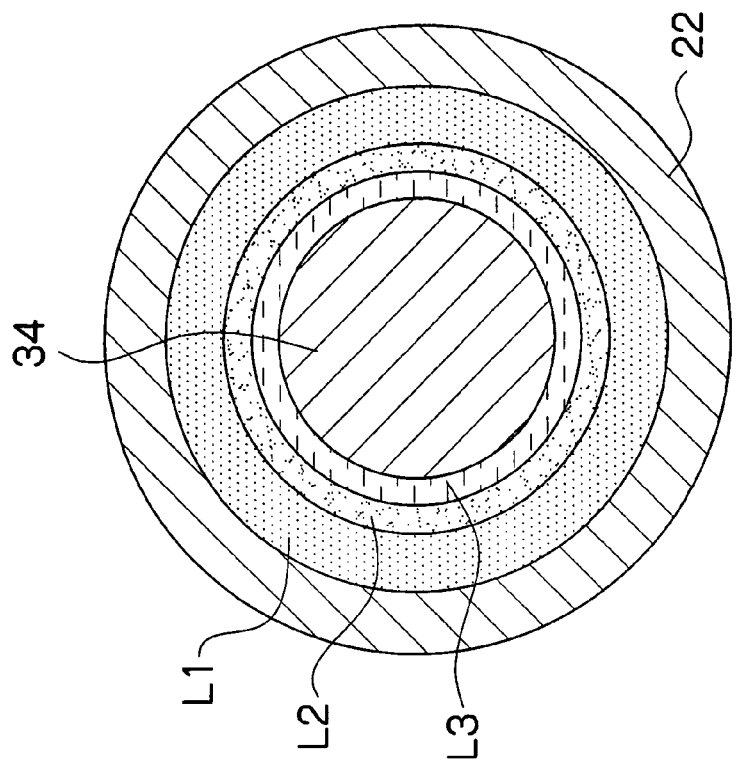
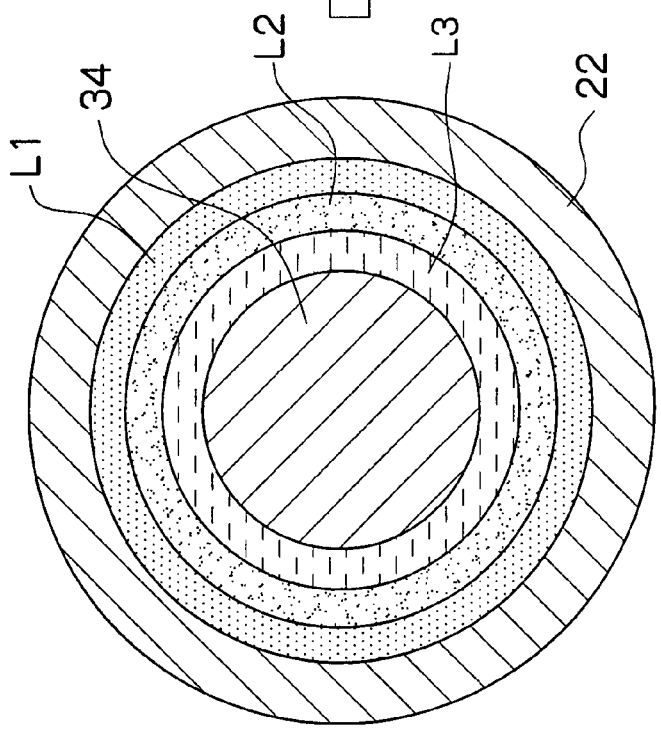

REACTION METHOD USING MICROREACTOR

BACKGROUND OF THE INVENTION

1. Field of the Invention

The present invention relates to a reaction method using a microreactor, particularly to an apparatus which manufactures materials and products in the fields of the chemical industry and medical product industry, and more particularly to a reaction method using a microreactor by the reaction of fluids which causes a plurality of fluids to join together in one reaction channel via respective fluid supply routes, whereby these fluids are caused to flow as laminar flows in the shape of thin layers and the fluids are diffused together in a normal direction of contact interfaces thereof to cause a reaction.

2. Description of the Related Art

In recent years, in the chemical industry and the medical product industry related to the manufacturing of medical products, reagents, etc., the development of new manufacturing processes using a microcontainer called a micromixer or microreactor has been pushed forward with. A micromixer or microreactor is provided with a microspace (reaction channel) which leads to a plurality of fine fluid supply routes, the equivalent diameter (circle-equivalent diameter) obtained when the section of the microspace (reaction channel) is converted to a circle being several micrometers to several hundreds of micrometers. By causing a plurality of fluids to flow together in the microspace through the plurality of fluid supply routes, the plurality of fluids are mixed together or caused to produce a chemical reaction simultaneously with the mixing. It is considered that a micromixer and a microreactor are common in their basic structure. In some cases, however, a microcontainer which mixes a plurality of fluids together is called a micromixer and a microcontainer which causes a chemical reaction during the mixing of a plurality of fluids is called a microreactor. Therefore, a microreactor of the present invention includes a micromixer.

There are examples of such a microreactor, for example, in PCT International Unexamined Patent Publication No. WO 00/62913, National Publication of International Patent Application No. 2003-502144 and Japanese Patent Application Publication No. 2002-282682. In all of these microreactors, two kinds of fluids are caused to flow through respective very fine fluid supply routes and introduced into a microspace as laminar flows in the form of a very thin layer, and in this microspace the two kinds of fluids are mixed together and caused to react with each other.

Next, points where the reaction by a microreactor as described above differs from batch type mixing and reaction by use of a stirring tank etc. will be described below. That is, because in general a chemical reaction occurs when molecules encounter each other at the interfaces of reaction fluids, when a reaction occurs in a microspace, the area of the interface increases relatively and the reaction efficiency increases remarkably. Furthermore, for the diffusion of molecules itself, the reaction time is in proportion to the square of distance. This means that as the scale of a microspace is reduced, mixing proceeds accordingly due to the diffusion of molecules even when the reaction fluids are not positively mixed, with the result that the reaction tends to occur easily. Furthermore, in a microspace, because of the small scale, the flow is dominated by laminar flows and the fluids diffuse in a laminar flow state while flowing in a direction orthogonal to the flow.

When such a microreactor is used, it is possible to perform the high-accuracy control of the reaction time and reaction temperature of fluids in comparison with, for example, a conventional batch method which uses a large-volume tank etc. as a field of reaction. In the case of a batch type method, particularly for fluids of rapid reaction time, the reaction proceeds on the reaction contact surfaces in the initial stage of mixing and furthermore primary products formed by the reaction of the fluids with each other continue to be subjected to the reaction within the tank, with the result that nonuniform reaction products may be produced. In contrast to this, in the case of a microreactor, fluids flow continuously without being resident within the microspace and hence primary products formed by the reaction of fluids with each other do not continue to be subjected to the reaction within the microspace. Therefore, it becomes possible to take out even pure primary products which have not hitherto been easily taken out.

When a chemical substance which has hitherto been manufactured in a small amount by use of an experimental production facility is to be manufactured in a large amount by use of a scaled up large-scale production facility, much labor and time have so far been required in order to obtain reproducibility in the batch type large-scale production facility in comparison with the experimental production facility. Owing to the concept of numbering up of the parallel arrangement of manufacturing lines using a microreactor according to the production amount, it is possible to substantially reduce the labor and time for obtaining this reproducibility.

Incidentally, because in a microreactor, the substance diffusion which involves the diffusion of fluids in a normal direction of contact surfaces of the fluids is basic to the reaction, the opening width of a reaction channel, which is the microspace, i.e., the distance orthogonal to the flow of fluids determines the characteristics of the reaction. And the fluids are caused to flow (be resident) within the reaction channel in such a manner that the diffusion and reaction of the fluids at the discharge port of the microreactor are completed according to the characteristics of the reaction. When a microreactor designed on the basis of such a basic principle is incorporated in a manufacturing process, because the opening width of the reaction channel is optimally designed according to the reaction characteristics (diffusion rate and reaction rate) of the fluids, it is impossible to cause an optimum reaction if fluids of different reaction characteristics are intended for a reaction with the same microreactor. Even if a reaction is made possible to some extent, the range of possible reaction changes, condition changes or changes of the product characteristics are greatly limited. Therefore, it is necessary to perform operations, such as using the manufacturing line as a dedicated line and replacing the microreactor with an appropriate one according to the reaction and conditions or product characteristics, providing the disadvantage that equipment cost rises and time losses due to replacement occur.

Furthermore, what poses a problem in a case where a reaction involving coagulation and precipitation occurs in the reaction channel is that coagulated matter and precipitates formed by the reaction adhere to the wall surface of the reaction channel and are deposited on it, thereby clogging the reaction channel. Although in order to prevent this there is available a method which involves performing surface treatment for preventing coagulated matter and precipitates from adhering to the wall surface of the reaction channel, for example, coating this wall surface with a coating agent, the effect of a coating agent on the prevention of adhering differs depending on the kinds of coagulated matter and precipitates and, therefore, different coating agents must be used according to the fluids handled. This is not an essential solution. As described above, a reaction obtained by use of a conventional microreactor has the defect that clogging troubles occur frequently and the disassembly cleaning to eliminate clogging troubles must be frequently performed.

SUMMARY OF THE INVENTION

The present invention was made in view of such a situation as described above and has as its object the provision of a reaction method using a microreactor which can adapt to various reactions and changes in conditions with the same microreactor and can minimize troubles and the frequency of disassembly cleaning because a reaction channel is prevented from being clogged and blocked with coagulated matter and precipitates formed by a reaction.

In order to achieve the above object, in the first aspect of the present invention, there is provided a reaction method using a microreactor which provides a plurality of fluid supply routes in communication with one reaction channel as a multicylindrical structure having a co-axis and causes a plurality of fluids to flow together in the reaction channel via the respective fluid supply routes, whereby these fluids are coaxially laminated and caused to flow as laminar flows whose sections orthogonal to the co-axis are annular and the fluids are diffused in a normal direction of contact interfaces of the fluids to cause a reaction, wherein among the plurality of laminated fluids, at least one of the plurality of laminated fluids is a fluid not participating in the reaction of other fluids.

It should be noted that a "reaction" in the present invention includes a reaction involving mixing. The kinds of reactions include various forms of reactions of inorganic and organic substances, such as an ionic reaction, a reduction-oxidation reaction, a thermal reaction, a catalytic reaction, a radical reaction and a polymerization reaction. Furthermore, fluids include a liquid, a gas, a solid-liquid mixture in which metal fine particles etc. are dispersed in a liquid, a gas-liquid mixture in which a gas is dispersed in a liquid without being dissolved, etc. A plurality of fluids are not limited to a case where the kinds of fluids are different or a case where the chemical compositions are different, and include, for example, a case where temperatures and states such as the solid-liquid ratio are different. Moreover, a multicylindrical structure is not limited to a structure of multiple circular cylinders and includes also a structure of multiple polyangular cylinders.

According to the first aspect of the present invention, among the plurality of laminated fluids, at least one fluid is a fluid not participating in the reaction of other fluids. Therefore, the thickness of the fluid participating in the reaction is varied by variously changing how to laminate the fluids or by increasing or decreasing the flow rate of the fluid not participating in the reaction, whereby it is possible to adapt to various reactions and changes in conditions with the same microreactor. Furthermore, because a plurality of fluid supply routes are provided as a multicylindrical structure having a co-axis and a plurality of fluids are caused to flow as laminar flows in the reaction channel, coagulated matter and precipitates formed by the reaction becomes less apt to adhere to the wall surface of the reaction channel and be deposited on this wall surface, with the result that it becomes possible to prevent the reaction channel from being clogged. Furthermore, because each fluid supply route is formed as a multicylindrical structure, by increasing the diameter of the multicylindrical structure without varying the opening width of each fluid supply route, the sectional shape of the fluid supply route, which is a circular form, is increased by this amount. As a result of this, because the volume of the fluid supply route increases, it is possible to easily increase the throughput while keeping the opening width of each fluid supply route suitable for the reaction characteristics of the fluids handled.

The second aspect of the present invention is that in the first aspect, the opening width of the reaction channel is not less than 1 μm but not more than 1000 μm. This concretely shows a preferred range of the scale of the opening width of the reaction channel, which is a microspace.

The third aspect of the present invention is that in the first or second aspect, the laminated laminar flows are constituted by 3 or more kinds of fluids and that, among these fluids, between the laminar flows formed by the fluids participating in the reaction is sandwiched a laminar flow of the fluid not participating in the reaction.

According to the third aspect, solutes are diffused into the layer of the fluid not participating in the reaction from the layers of the fluids participating in the reaction which are on both sides of the layer of the fluid not participating in the reaction and the solutes can be caused to react in a condition appropriately diffused by the layer of the fluid not participating in the reaction. Therefore, it is possible to prevent the coagulation which occurs when solutes are caused to react with each other under high concentration conditions and to improve the homogenization of reaction products formed by the reaction.

The fourth aspect of the present invention is that in any one of the first to third aspects, the laminated laminar flows are constituted by 3 or more kinds of fluids and, among these fluids, the fluid not participating in the reaction is used as a fluid in contact with a wall surface of the reaction channel.

According to the fourth aspect, in order to prevent reaction products formed by the fluids participating in the reaction and the reaction from coming into contact with the wall surface of the reaction channel, the fluid not participating in the reaction is used as a fluid in contact with a wall surface of the reaction channel. As a result of this, the reaction becomes less apt to occur near the wall surface of the reaction channel where the flow velocity of the fluids is low and coagulated matter and precipitations formed by the reaction becomes less apt to adhere and be deposited. Therefore, the clogging of the reaction channel can be prevented.

The fifth aspect of the present invention is that in any one of the first to fourth aspects, the laminated laminar flows are constituted by 3 or more kinds of fluids and, among these fluids, the fluids participating in the reaction form regular annular laminar flows. For example, if a fluid A and a fluid B both participating in the reaction are alternately arranged as layers of annual tree ring having regularity, the reaction occurs by the diffusion from both sides of the external side and internal side and, therefore, the reaction can be accelerated. Furthermore, if a fluid A and a fluid B both participating in the reaction are alternately arranged as annual-rings-like layers having regularity, the thickness of the fluids per layer can be reduced and, therefore, the reaction can also be accelerated by this.

The sixth aspect of the present invention is that in any one of the first to fifth aspects, the thickness of the fluids participating in the reaction is varied by increasing or decreasing the flow rate of the fluid not participating in the reaction.

According to the sixth aspect, because the thickness of the fluids participating in the reaction is varied by increasing or decreasing the flow rate of the fluid not participating in the reaction, it is possible to vary the thickness of the fluids participating in the reaction according to the reaction characteristics of the fluids handled. As a result of this, it is possible to adapt to various reactions and changes in conditions with the same microreactor.

The seventh aspect of the present invention is that in any one of the first to sixth aspects, the fluid not participating in the reaction is a solvent component of the fluids participating in the reaction.

A solvent liquid of the fluids participating in the reaction is preferred as the fluid not participating in the reaction, and a solvent gas is preferred when a gas is used as the fluid.

The eighth aspect of the present invention is that in any one of the first to seventh aspects, the laminated laminar flows are constituted by 3 or more kinds of fluids and, among these fluids, apart from layers formed by the fluids participating in the reaction, a layer for an extraction fluid for extracting and separating reaction products of the reaction is formed, and a desired reaction product formed by the reaction is extracted and separated by the extraction fluid.

According to the eighth aspect, because a layer for an extraction fluid for extracting and separating reaction products of the reaction is formed, when a reaction is caused by the fluids participating in the reaction and reaction products have formed to some extent, the reaction products are extracted and separated by causing the reaction products to encounter the extraction fluid. In this case, because the laminar flow of each fluid does not lose its shape, reaction products can be efficiently separated by separating and taking out only the layer of the extraction fluid after the extraction and separation of the reaction products.

The ninth aspect of the present invention is that in any one of the first to eighth aspects, in each of the fluid supply routes formed in the multicylindrical structure of the co-axis, a plurality of fluid supply ports are arranged at equal intervals in a circumferential direction of the multicylindrical structure. As a result of this, because the fluids can be uniformly supplied to the fluid supply routes, it is possible to ensure that the coaxially laminated sections formed by the confluence in the reaction channel positively form annular laminar flows.

The tenth aspect of the present invention is that in any one of the first to ninth aspects, the reaction temperature of fluids flowing in the reaction channel is controlled. As a result of this, the reaction rate can be controlled.

As described above, according to a reaction method using a microreactor of the present invention, it is possible to adapt to various reactions and changes in conditions with the same micrometer and it is possible to prevent the reaction channel from being clogged and blocked with coagulated matter and precipitates formed by the reaction. Therefore, troubles and the frequency of disassembly cleaning can be minimized.

BRIEF DESCRIPTION OF THE DRAWINGS

FIG. 7A and FIG. 7B are views to explain another mode of a reaction method using a microreactor of the present invention, which is a sectional view of a reaction channel which receives three kinds of fluids from three fluid supply routes and in which the thickness of a fluid participating in the reaction is reduced by increasing the flow rate of a fluid not participating in the reaction;

DETAILED DESCRIPTION OF THE PREFERRED EMBODIMENTS

Preferred embodiments of a reaction method using a microreactor related to the present invention will be described below by referring to the accompanying drawings.

Figure 1:
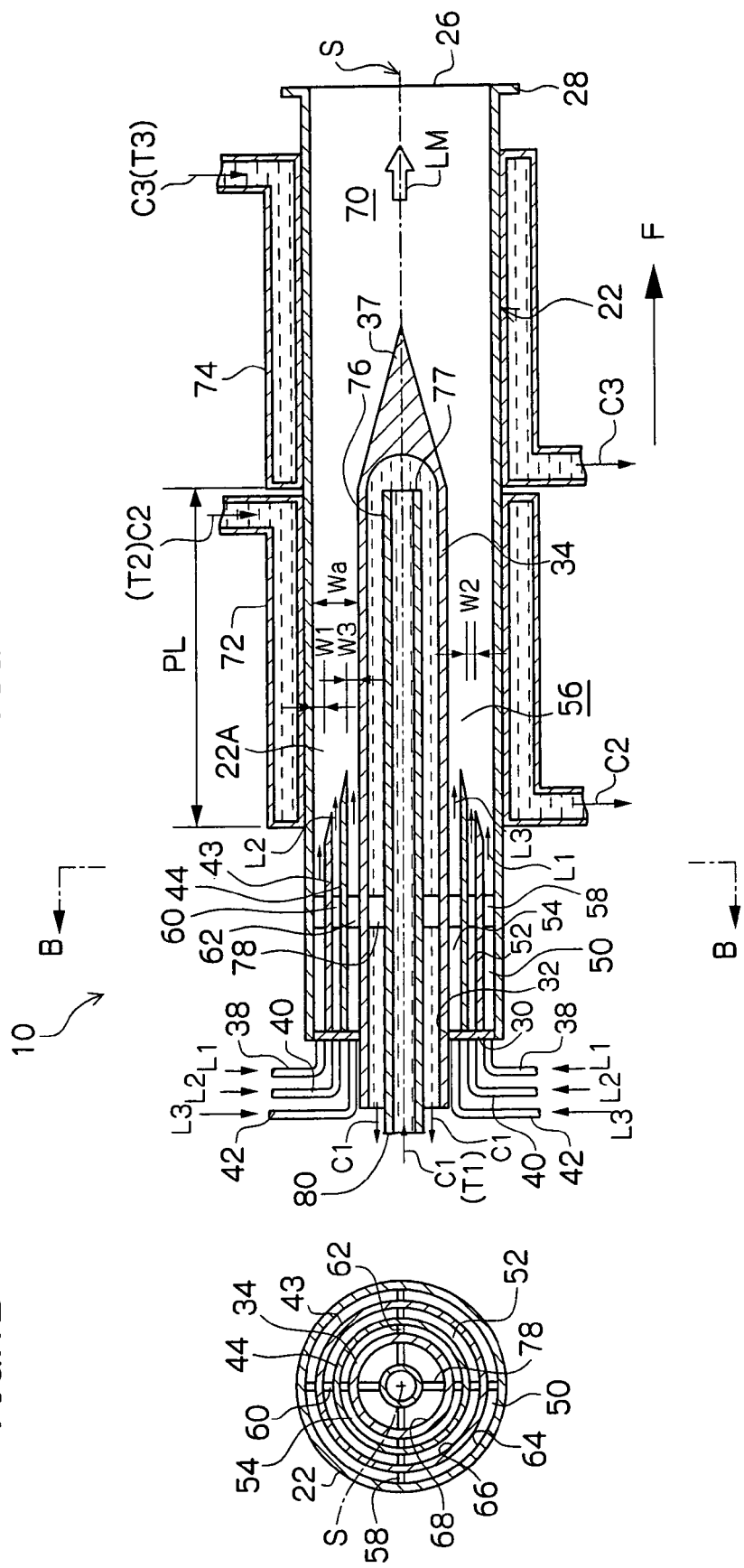
FIG. 1A is a longitudinal sectional view to explain the general configuration of a microreactor to which a reaction method using a microreactor of the present invention is applied.
FIG. 1B is a cross sectional view of the microreactor shown in FIG. 1A.

FIGS. 1A and 1B are each a sectional view to explain an example of the construction of a microreactor to which a reaction method using a microreactor of the present invention can be applied. In this case, the three types of fluids L1, L2 and L3 are used as fluids.

As shown in FIGS. 1A and 1B, a microreactor 10 is formed in the shape of a roughly circular cylinder and provided with a cylindrical round tube portion 22 which forms the outer shell part of the apparatus. The straight line S in the figures designate the axis of the apparatus, and the following descriptions will be given by using the direction along this axis S as the axial direction of the apparatus. A discharge port 26 for a reaction fluid LM after the reaction of the fluids L1, L2, L3 opens at the leading end surface of this round tube portion 22, and a ring-shaped flange portion 28 is installed in the leading end portion of the round tube portion 22 so as to extend in an elongated condition toward the outer circumferential part of the discharge port 26. This flange part 28 is connected to piping etc. which perform liquid feeding to another microreactor etc. which perform the next treatment of the reaction fluid LM.

The base end surface of the round tube portion 22 is blocked with a cover plate 30, and a circular insertion hole 32 is bored in the center portion of this cover plate 30. Within the round tube portion 22, there is coaxially provided a flow regulating member 34 in the shape of a round cylinder so as to be inserted from the side of this base end portion into the round tube portion 22, and the base end portion of the flow regulating member 34 is fitted into the insertion hole 32 of the cover plate 30 and supported thereby.

Figure 2:
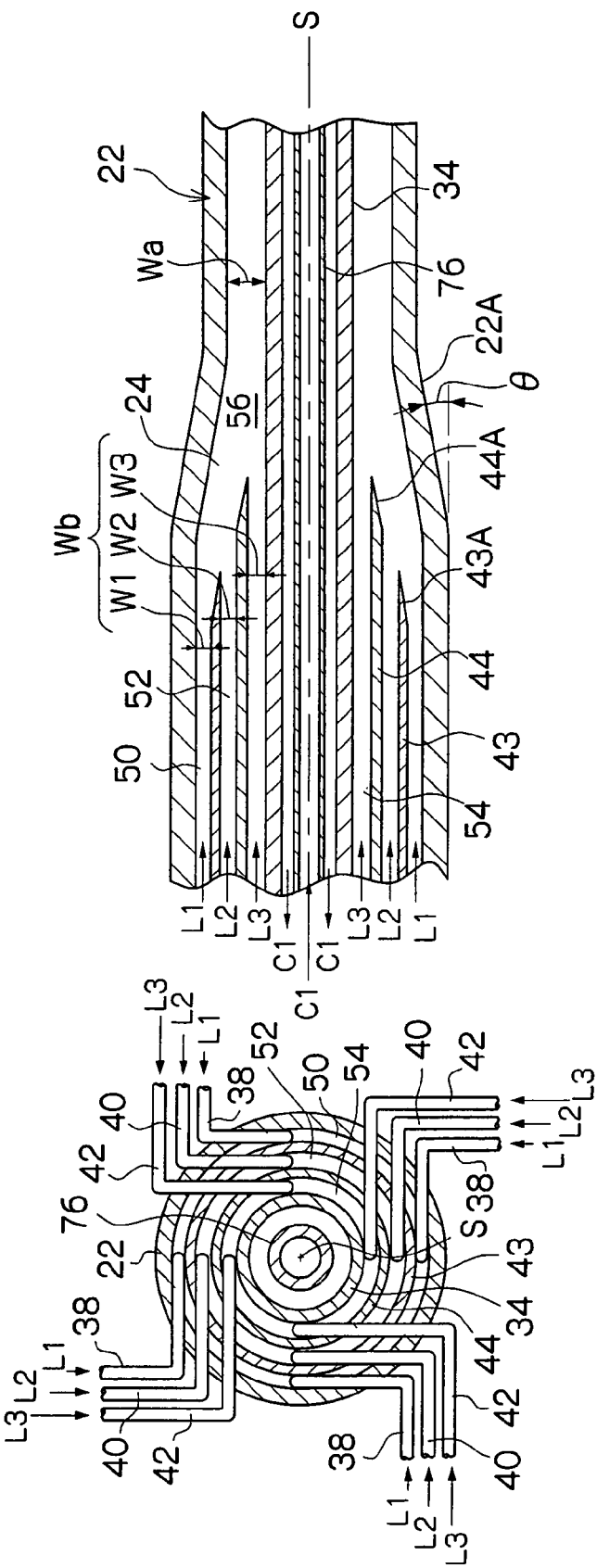
FIG. 2A is a partially enlarged view to explain an example of a modification of a microreactor.
FIG. 2B is a cross sectional view of the microreactor shown in FIG. 2A.

Within the round tube portion 22, a first cylindrical partition wall member 43 and a second cylindrical partition wall member 44 which partition the space in the round tube portion 22 along the axial direction are provided in the shape of multiple cylinders, and the base end surfaces of each of the partition wall members 43, 44 are mounted to the cover plate in a fixed condition. These partition wall members 43, 44 are each arranged coaxially with respect to the round tube portion 22 and the flow regulating member 34 and partition a space having a section in the shape of a circular ring between the round tube portion 22 and the flow regulating member 34 so as to divide this space into 3 parts coaxially. The proportion of these divided portions is determined according to the ratio of the supply volumes of the fluids L1, L2, L3. And a plurality of spacers 58 (in the configuration of this embodiment, 4 spacers) are interposed between the inner circumferential surface of the round tube portion 22 and the outer circumferential surface of the first partition wall member 43, and at the same time, a plurality of spacers 60 (in the configuration of this embodiment, 4 spacers) are interposed between the first partition wall member 43 and the second partition wall member 44. Furthermore, a plurality of spacers 62 (in the configuration of this embodiment, 4 spacers) are interposed also between the inner circumferential surface of the second partition wall member 44 and the outer circumferential surface of the flow regulating member 34. These plurality of spacers 58, 60, 62 are each formed in the shape of a rectangular plate and supported in such a manner that their front and back surface portions are parallel to the flow direction (direction of arrow F) of the fluids L1, L2, L3 in the round tube portion 22. These spacers 58, 60, 62 connect and fix the two partition wall members 43, 44 and the flow regulating member 34 to the round tube portion 22, thereby setting the opening widths W1, W2, W3 (refer to FIG. 2A) in the radial direction of fluid supply routes 50, 52, 54 (direction orthogonal to the flow direction of the fluids). As a result of this, the two partition wall members 43, 44 and the flow regulating member 34 are each connected and fixed to the round to be portion 22 with a sufficient strength and prevented from undergoing displacement from prescribed positions or being deformed due to the effect of the liquid pressure of the fluids L1, L2, L3 and gravity, and at the same time, the opening widths W1, W2, W3 are positively maintained in the sizes set beforehand.

The space having a section in the shape of a circular ring partitioned by the first and second partition wall members 43, 44 are called here a first fluid supply route 50, a second fluid supply route 52 and a third fluid supply route 54 in order from the outside. Insertion holes which are in communication with the respective fluid supply routes 50, 52, 54 are bored in the cover plate 30 provided at the base end surface of the round tube portion 22, and fluid supply tubes 38, 40, 42 which supply the fluids L1, L2, L3 to these first to third fluid supply routes 50, 52, 54 are connected to these insertion holes. As a result of this, through these liquid supply tubes 38, 40, 42 the fluids L1, L2 and L3 in a pressurized condition are supplied to the first to third fluid supply channels 50, 52, 54 from three fluid supply sources (not shown) provided on the upstream side of the microreactor 10.

Within the round tube portion 22, on the leading end side as viewed from the partition wall members 43, 44 and at the same time, on the base end portion side as viewed from a conical portion 37 of the flow regulating member 34, there is formed a space having a section in the shape of a circular ring which is in communication with the fluid supply routes 50, 52, 54, and this space having a section in the shape of a circular ring serves as a reaction channel 56 where the fluids L1, L2, L3 respectively supplied from the fluid supply routes 50, 52, 54 join together to perform the reaction.

As shown in FIG. 1B, in the leading end portions of the first fluid supply route 50, second fluid supply route 52 and third fluid supply route 54 are formed a first fluid supply port 64, a second fluid supply port 66 and a third fluid supply port 68, each of which opens into the reaction channel 56. These fluid supply ports 64, 66, 68 open each with a section in the shape of a circular ring along a circular locus around the axis S and are arranged so as to form a concentric circle with respect to one another. The opening widths W1, W2, W3 respectively define the opening areas of the fluid supply ports 64, 66, 68, and the initial flow velocities of the fluids L1, L2, L3 introduced through the fluid supply ports 64, 66, 68 into the reaction channel 56 are fixed according the opening areas of the fluid supply ports 64, 66, 68 and the supply volumes of the fluids L1, L2, L3. These opening widths W1, W2, W3 are set, for example, so that the flow velocities of the fluids L1, L2, L3 supplied through the fluid supply ports 64, 66, 68 into the reaction channel 56 become equal to each other.

The space on the leading end side as viewed from the reaction channel 56 within the round tube portion 22 is a discharge liquid route 70 in which the reaction fluid LM for which the reaction of the fluids L1, L2, L3 has occurred within the reaction channel 56 flows toward the discharge port 26. When the reaction fluid LM is formed by the reaction of the fluids L1, L2, L3, it is necessary that in the outlet portion within the reaction channel 56, the reaction of the fluids L1, L2, L3 be completed. Therefore, it is necessary that a route length PL (refer to FIG. 1A) of the reaction channel 56 along the flow direction of the fluids L1, L2, L3 be set as a length along which the reaction of the fluids L1, L2, L3 is completed. Incidentally, it is assumed that without a gap the interior of the microreactor 10 is constantly filled with the fluids L1, L2, L3 and the reaction fluid LM after the reaction of these fluids L1, L2, L3, which are flowing toward the discharge port 26.

Furthermore, as shown in FIG. 1A, two jackets 72, 74 through which heat media C2, C3 having a relatively large heating capacity, such as water and oil, flow are wound around the outer circumference of the round tube portion 22, and the jackets 72, 74 are connected to heating medium supply devices not shown in the drawing. The heat media C2, C3 which control the reaction temperature of the fluids L1, L2, L3 within the round tube portion 22 are supplied from the heating medium supply devices to the jackets 72, 74 and circulated again to the heat medium supply devices. It is desirable to appropriately set the temperatures T2, T3 of the heating media C2, C3 supplied to the jackets 72, 74 according to the reaction temperature or the kinds of the fluids L1, L2, L3, and the temperatures T2, T3 may be different from each other. The flow regulating member 34 has a thin-walled outer shell portion and a hollow interior. Within the flow regulating member 34, a heat medium supply tube 76 having a diameter smaller than the inside diameter of the flow regulating member 34 is inserted from the base end side of the flow regulating member 34, and the heat medium supply tube 76 is supported coaxially with the flow regulating member 34 by a blocking plate (not shown) which blocks the opening of the flow regulating member 34 on the base end side thereof and a plurality of spacers 78. A leading end opening 77 of the heat medium supply tube 76 reaches the vicinity of the base of the conical portion 37, and a supply port 80 which supplies a heat medium C1 into the flow regulating member 34 opens into the leading end surface. Through this supply port 80 also to the heating medium supply tube 76, the heat medium C1 of the temperature T1 is supplied from the heat medium supply device and the reaction temperature is controlled.

As the material for the portions in contact with the solutions in the microreactor 10, metal materials such as iron, aluminum, stainless steel, titanium and various alloys, resin materials such as fluoroplastics and acrylic resins, and glass materials such as silicon and glass can be used.

In the microreactor 10 constructed as described above, the fluids L1, L2, L3 which have flown through the fluid supply routes 50, 52, 54 join together in the reaction channel 56 under appropriate reaction temperature conditions and flow as laminar flows which are coaxially laminated to as to have a section in the form of a circular ring. And in the three fluids L1, L2, L3 which flow through the reaction channel 56, the molecules of each of the fluids L1, L2, L3 are mutually diffused to undergo a reaction at the contact interfaces between the mutually adjoining laminar flows. As a result of this, the fluids L1, L2, L3 can complete a uniform reaction in a short time. In this case, it is important that the thickness of the fluids in the reaction channel 56 be small and that the diffusion distance be short, and it is necessary that the opening width Wa of the reaction channel 56 (refer to FIGS. 1 and 2) be not less than 1 μm but less than 1000 μm.

FIGS. 2A and 2B each show an example of a modification of the microreactor 10. In this case, by forming a taper portion 22A in the round tube portion 22, the flow is contracted by reducing the opening width of the reaction channel 56 near a point of contraction of a plurality of fluids. In this case, as shown in FIG. 2A, it is preferred that also in the leading end portions of the first and second partition wall members 43, 44, taper portions 43A, 44A having an inclination substantially parallel to the inclination of the taper portion 22A of the round tube portion 22 are formed. As a result of this, it is possible to perform smooth contraction. Furthermore, when the total of the opening widths W1, W2, W3 of the fluid supply routes 50, 52, 54 before contraction is designated by Wb (equal to the total of the thicknesses of the fluids L1, L2, L3 before contraction) and the opening width of the reaction channel 56 after contraction is designated by Wa (equal to the total of the thicknesses of the fluids L1, L2, L3 after contraction), it is ensured that Wb/Wa<1. In this case, when a microreactor is to be fabricated without performing contraction as in a conventional manner, multiple fluid supply routes 50, 52, 54 are required (at least two are required) and, therefore, there is no choice other than a case where the opening width of one fluid supply route is smaller than the opening width Wa of the reaction channel 56. However, when contraction is performed as in the example of modification of the present invention, it is possible to make the opening width of one fluid supply route large, for example, to make it larger than the opening width Wa of the reaction channel 56. Furthermore, as shown in FIG. 2B, because the fluid supply routes 50, 52, 54 are formed as a multicylindrical structure, it is preferred that the fluid supply ports of the plurality of fluid supply tubes 38, 40, 42 be arranged at equal intervals in the circumferential direction of the multicylindrical structure in order to supply fluid uniformly to the fluid supply routes 50, 52, 54. FIG. 2B shows an example of modification in which the fluid supply tubes 38, 40, 42 are each provided with 4 fluid supply ports spaced at 90° intervals. Arranging a plurality of fluid supply ports in this manner applies also to the microreactor 10 of FIGS. 1A and 1B for which contraction is not performed.

As shown in FIG. 2A, the inclination angle θ of the taper portion 22A when contraction is performed is not less than 1° but less than 90° with respect to the axis S, preferably not less than 1° but less than 60°, and especially preferably not less than 1° but less than 30°. As a result of this, because the flow is gently contracted, and not abruptly contracted, it can be ensured that the exfoliation of the flow from the wall surface, eddy currents, stagnation, etc. do not occur. In this case, it is more preferred that the taper portion 22A be formed in streamlined shape by rounding the start position (contraction start position) and end position (contraction end position) of the taper portion 22A. Because by forming the taper portion 22A in streamlined shape in this manner, the fluid is smoothly contracted, it can be further ensured that the exfoliation of the flow from the wall surface, eddy currents, stagnation, etc. do not occur.

Next, a reaction method of the present invention using the microreactor 10 constructed as described above will be described below.

The construction of the microreactor 10 used in a reaction method of the present invention is such that the microreactor provides a plurality of supply routes 50, 52, 54 in communication with one reaction channel 56 as a multicylindrical structure having a co-axis and causes a plurality of fluids L1, L2, L3 to flow together in the reaction channel 56 via the respective fluid supply routes 50, 52, 54, whereby these fluids are coaxially laminated and caused to flow as laminar flows whose sections orthogonal to the co-axis are annular and the fluids are diffused in a normal direction of contact interfaces thereof to cause a reaction. And in a reaction method of the present invention, at lest one of the plurality of laminated fluids L1, L2, L3 is constituted by a fluid not participating in the reaction of other fluids.

In this manner, among the plurality of laminated fluids L1, L2, L3 which flow through the reaction channel 56, by variously changing how to laminate the fluids (or the fluid) participating in the reaction and the fluids (or the fluid) not participating in the reaction or by increasing or decreasing the flow rate of the fluid not participating in the reaction, it is possible to adapt to various reactions and changes in conditions with the same microreactor 10.

FIG. 3 to FIGS. 9A to 9B show various modes of a reaction method of the present invention, each being a sectional view in the radial direction of the reaction channel 56 (direction orthogonal to the flow of the fluids).

Figure 3:
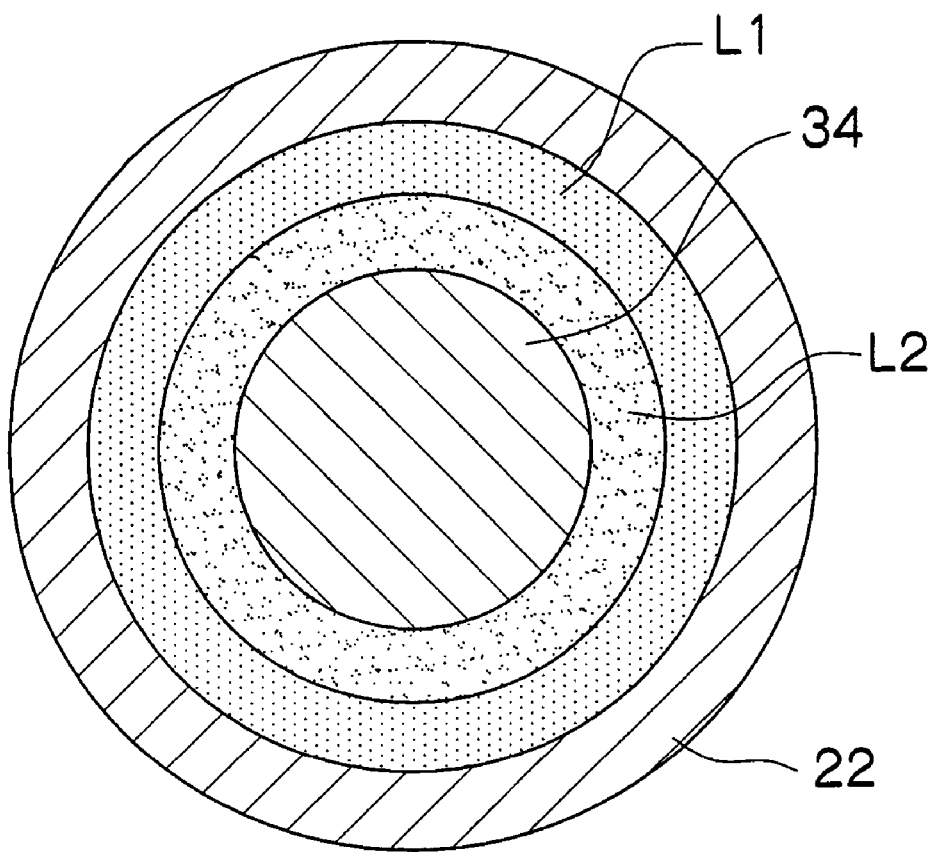
FIG. 3 is a sectional view of a reaction channel to explain a mode of a reaction method using a microreactor of the present invention.

FIG. 3 shows a case where two kinds of fluid L1, L2 are supplied to two fluid supply routes, one fluid participating in the reaction and the other not participating in the reaction, whereby the fluids are laminated in the shape of a two-layer circular ring and caused to flow through the reaction channel 56.

In a case where one of the two kinds of fluids L1, L2 is used as the fluid not participating in the reaction, the number of the fluids participating in the reaction is one. This is a reaction method by which the reaction is caused by adding energy (light, heat, etc.) from the outside to one fluid which previously contains a substance promoting the reaction such as a catalyst. Furthermore, because exothermic and endothermic actions occur in the process of the reaction, in order to control or alleviate it is possible to cause heat to be received from or given to the fluid not participating in the reaction as a heating medium and it is also possible to use the fluid not participating in the reaction in controlling the reaction temperature. Also in this case, by variously changing how to laminate the fluid participating in the reaction and the fluid not participating in the reaction or by increasing or decreasing the flow rate of the fluid not participating in the reaction, it is possible to adapt to various reactions and changes in conditions with the same microreactor 10. For example, because the layer thickness of the fluid L1 participating in the reaction on the side of the outer circumferential wall surface is changed by increasing or decreasing the flow rate of the fluid L2 on the side of the inner circumferential wall surface of the reaction channel 56, it is possible to adapt to various reactions and changes in conditions.

Figure 4:
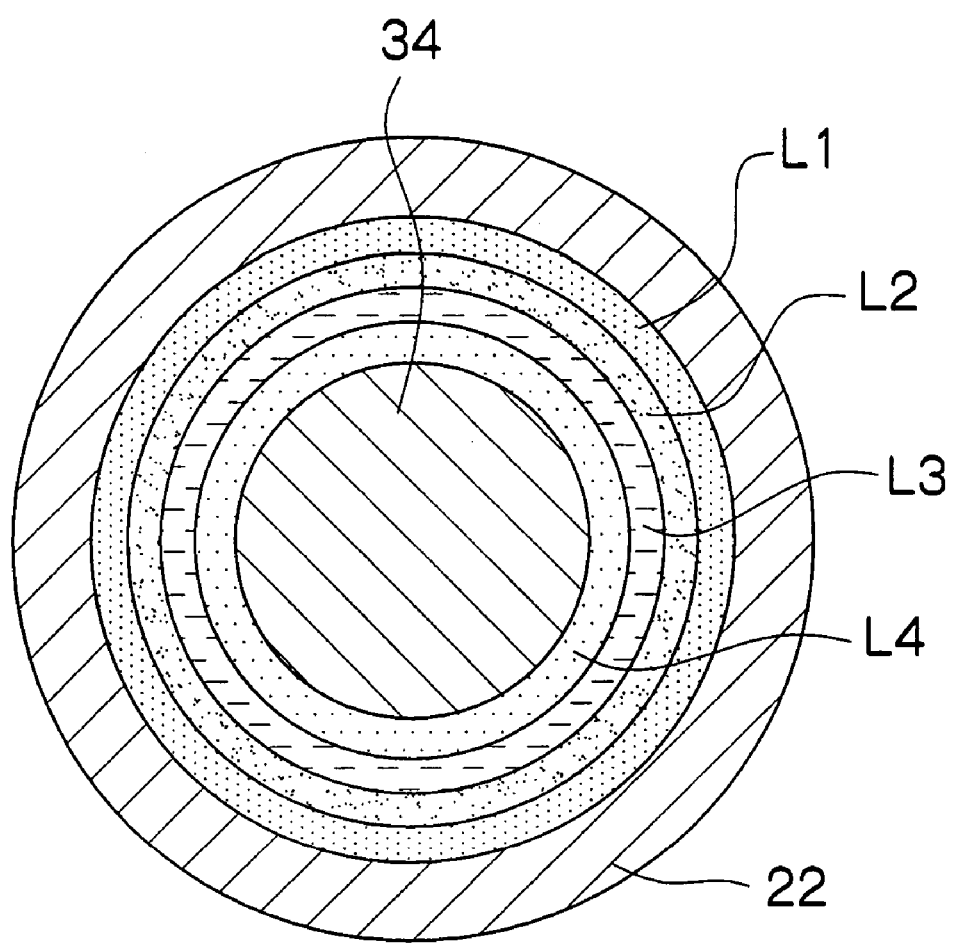
FIG. 4 is a view to explain another mode of a reaction method using a microreactor of the present invention, which is a sectional view of a reaction channel which receives four kinds of fluids from four fluid supply routes.

FIG. 4 shows a case where by supplying four kinds of fluids L1, L2, L3, L4, which include fluids (or a fluid) participating in the reaction and fluids (or a fluid) not participating in the reaction, to four fluid supply routes, whereby these fluids are laminated in the shape of a four-layer circular ring and caused to flow through the reaction channel 56. Also in this case, by variously changing how to laminate the fluids (or the fluid) participating in the reaction and the fluids (or the fluid) not participating in the reaction or by increasing or decreasing the flow rate of the fluids (or the fluid) not participating in the reaction, it is possible to adapt to various reactions and changes in conditions with the same microreactor 10 and, at the same time, it is possible to ensure that the reaction channel 56 from being clogged with coagulated matter and precipitated formed by the reaction.

Figure 5:
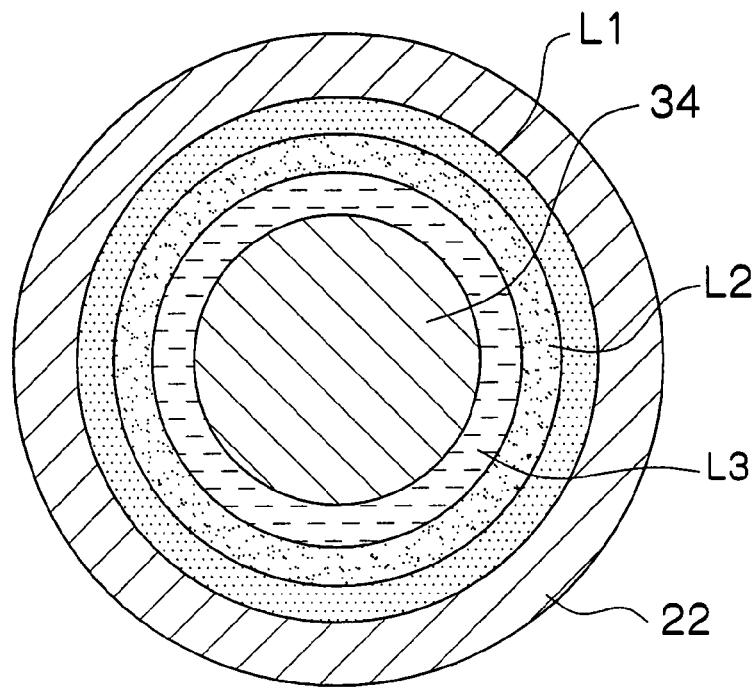
FIG. 5 is a view to explain another mode of a reaction method using a microreactor of the present invention, which is a sectional view of a reaction channel which receives three kinds of fluids from three fluid supply routes and in which a fluid not participating in the reaction is sandwiched between fluids participating to the reaction.

FIG. 5 shows a case where by supplying three kinds of fluids L1, L2, L3, which include fluids participating in the reaction and a fluid not participating in the reaction, to three fluid supply routes, whereby these fluids are laminated in the shape of a three-layer circular ring and caused to flow through the reaction channel 56. In this case, a laminar flow of the fluid L2 not participating in the reaction is sandwiched between laminar flows formed by the fluids L1, L3 participating in the reaction.

By constituting the laminations of the fluids L1, L3 participating in the reaction and the fluid 2 not participating in the reaction in this manner, it is ensured that with the fluid L2 not participating in the reaction serving as a substantial reaction-carrying-out layer, the fluids L1, L3 participating in the reaction, which sandwich this reaction-carrying-out layer, can be used as a pair of solute supply layers to supply solutes for performing the reaction. That is, it is ensured that solutes which are diffused from the pair of solute supply layers on both sides to the reaction-carrying-out layer can be caused to react in a condition appropriately diluted in the reaction-carrying-out layer. As a result of this, it is possible to prevent coagulation which might occur when solutes are caused to react with each other under high concentration conditions or to improve the homogenization of reaction products formed by the reaction.

Figure 6:
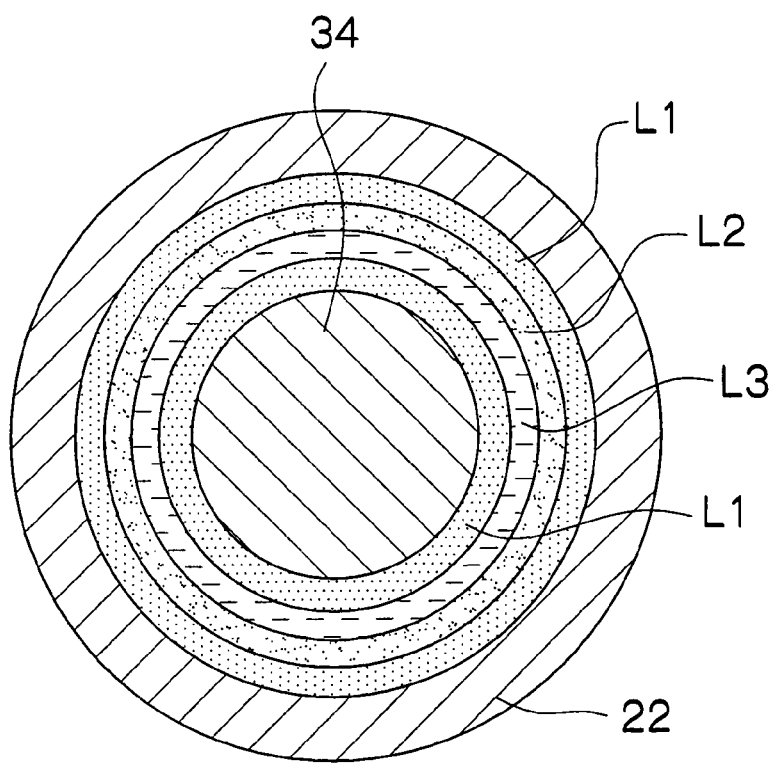
FIG. 6 is a view to explain another mode of a reaction method using a microreactor of the present invention, which is a sectional view of a reaction channel which receives three kinds of fluids from four fluid supply routes and in which a fluid not participating in the reaction is arranged as a fluid which comes into contact with the inner circumferential wall surface and outer circumferential wall surface of the reaction channel.

FIG. 6 shows a case where by supplying three kinds of fluids L1, L2, L3, which include fluids participating in the reaction and fluids not participating in the reaction, to four fluid supply routes, whereby these fluids are laminated in the shape of a four-layer circular ring and caused to flow through the reaction channel 56. In this case, one fluid L1 not participating in the reaction is caused to flow on the side of the outer peripheral wall of the reaction channel 56 and another fluid L1 not participating in the reaction is caused to flow on the side of the inner peripheral wall of the reaction channel 56.

As a result of this, even when reaction products are coagulated matter and precipitates, the reaction products can be prevented from adhering to the reaction channel 56 and being deposited thereon as far as possible and, therefore, the clogging of the reaction channel 56 can be suppressed. In this case, the plurality of fluid supply routes 50, 52, 54 are formed as a multicylindrical structure having a co-axis so that laminar flows in the shape of a circular ring are formed in the reaction channel 56 and the number of wall surfaces of the reaction channel 56 is only two, i.e., the wall surfaces of the reaction channel 56 are only the inner circumferential wall surface and the outer circumferential wall surface. Therefore, it is necessary to consider only the fluids which come into contact with the inner circumferential wall surface and outer circumferential wall surface of the reaction channel 56. Furthermore, because by providing the multicylindrical structure of the present invention, there is no corner portion (no angular portion) where the fluids are apt to be resident or generate eddy currents, coagulated matter of reaction products is less apt to adhere to the wall surface of the reaction channel 56 and be deposited thereon. In this case, this effect is obtained also from a structure of multiple polyangular cylinders in addition to a structure of multiple circular cylinders. In contrast to this, in the case of a conventional microreactor having a reaction channel with a rectangular section, it is necessary to consider the contact with the upper and lower wall surfaces and the right and left wall surfaces and besides there are four corner portions, where coagulated matter and precipitates are apt to adhere and be precipitated.

FIGS. 7A and 7B each show a case where by supplying three kinds of fluids L1, L2, L3, which include fluids participating in the reaction and a fluid not participating in the reaction, to three fluid supply routes, whereby these fluids are laminated in the shape of a three-layer circular ring and caused to flow through the reaction channel 56. In this case, the flow rate of the fluid L1 not participating in the reaction is increased or decreased.

Because as described above, in the microreactor 10, the substance diffusion which involves the diffusion of fluids in a normal direction of contact surfaces of the fluids is basic to the reaction, the opening width of the reaction channel 56, which is a microspace, i.e., the distance orthogonal to the flow of fluids determines the characteristics of the reaction. Therefore, in a case where conventionally, fluids having different reaction characteristics are caused to react by use of the same microreactor, it was impossible to cause an optimum reaction and it was feared that uniform reaction products may be formed. However, according to a reaction method of the present invention, by increasing or decreasing the flow rate of the fluid L1 not participating in the reaction, it is possible to vary the thicknesses of the fluids L2, L3 participating in the reaction without changing the flow rate of the fluids L2, L3 participating in the reaction and, therefore, it is possible to handle fluids having different reaction characteristics with the same microreactor 10.

For example, as shown in FIGS. 7A and 7B, by increasing the flow rate of the fluid L1 not participating in the reaction, it is possible to reduce the thickness of the fluids L2, L3 participating in the reaction from the level shown in FIG. 7A to the level shown in FIG. 7B. As a result of this, by use of the fluid L1 not participating in the reaction, the thickness of the fluids L2, L3 participating in the reaction can be reduced by contracting the fluids L2, L3 participating in the reaction. Therefore, even when the opening widths W1, W2, W3 of the fluid supply route are not changed, it is possible to obtain the same effect as when the opening widths W1, W2, W3 are changed by using a reaction method of the present invention. Furthermore, as in the example of a modification shown in FIGS. 2A and 2B, by combining the contraction from a structural perspective, which involves contracting the flow by reducing the diameter of the fluids near the point of confluence 24 where a plurality of fluids flow together, and the above-described contraction by the fluid not participating in the reaction, it is possible to adapt to further various reactions and reaction conditions.

Figure 8:
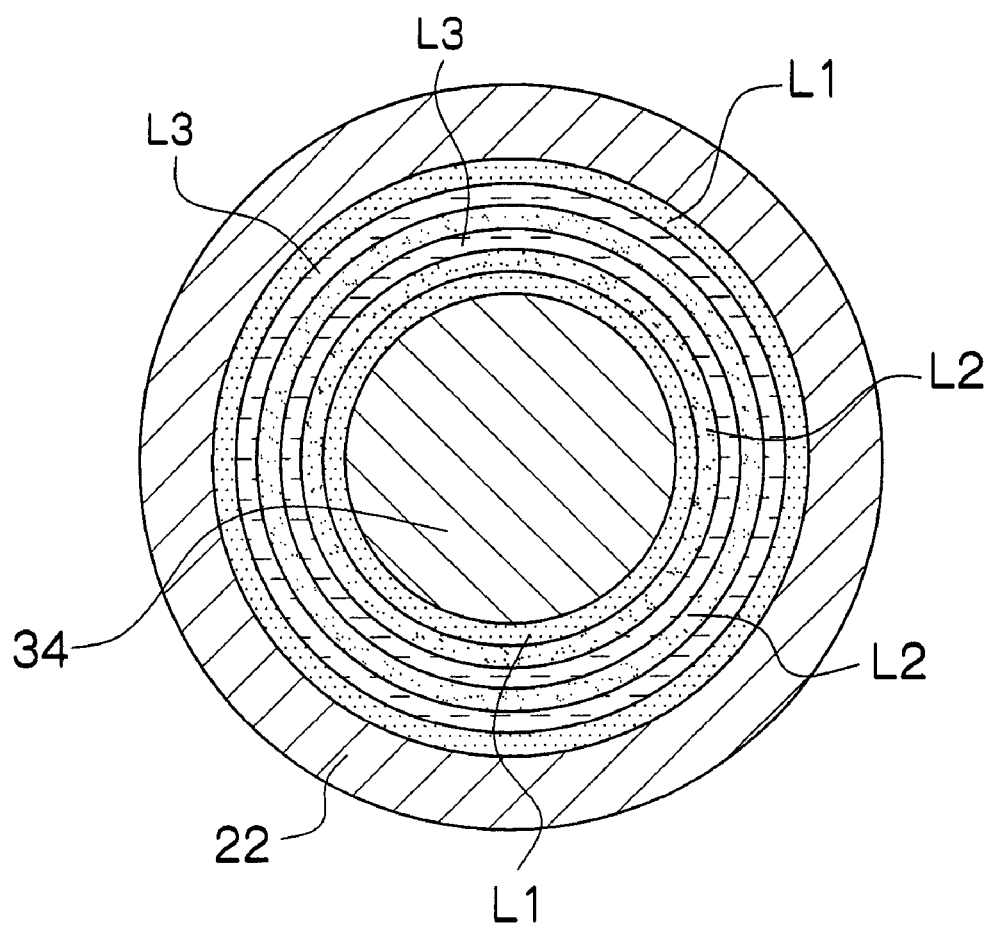
FIG. 8 is a view to explain another mode of a reaction method using a microreactor of the present invention, which is a sectional view of a reaction channel which receives three kinds of fluids from six fluid supply routes in such a manner that fluids participating in the reaction form regular annular laminar flows.

FIG. 8 shows a case where among six fluid supply routes, only the innermost and outermost fluid supply routes are supplied with the fluid L1 not participating in the reaction so that the fluids L2, L3 participating in the reaction are alternately arranged in the four fluid supply routes between the innermost and outermost fluid supply routes, whereby regular annular laminar flows are formed.

Because the reaction occurs due to the diffusion from both inner and outer sides by arranging the fluids L2, L3 participating in the reaction as annual-rings-like layers having regularity, it is possible not only to accelerate the reaction, but also reduce the thickness of the fluid per layer even when the supply volume of the fluids participating in the reaction is the same, and this reduction of the thickness also promotes the reaction. Furthermore, by arranging the fluid L1 not participating in the reaction in the innermost and outermost fluid supply routes, it is ensured that coagulated matter and precipitates formed by the reaction do not adhere to the wall surface of the reaction channel 56 or be deposited on this wall surface.

Figure 9A:
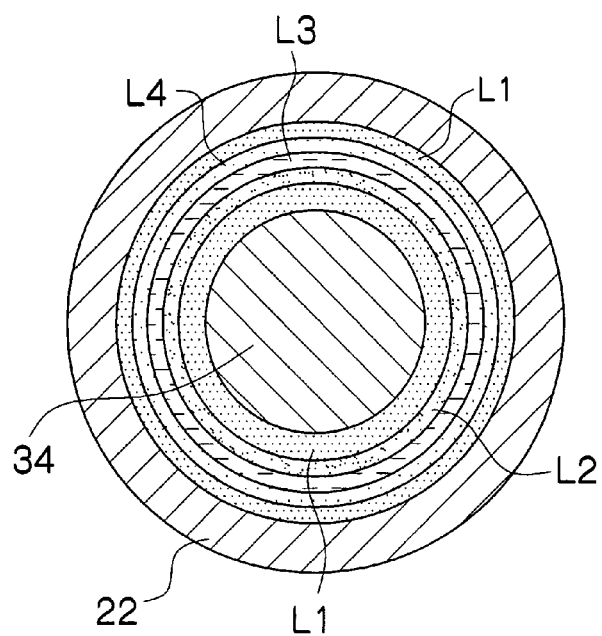
FIG. 9A and FIG. 9B are views to explain another mode of a reaction method using a microreactor of the present invention, which is a sectional view of a reaction channel which receives four kinds of fluids from five fluid supply routes in such a manner that apart from layers formed by fluids participating in the reaction, a layer for an extraction fluid for extracting and separating reaction products of the reaction is formed.
Figure 9B:
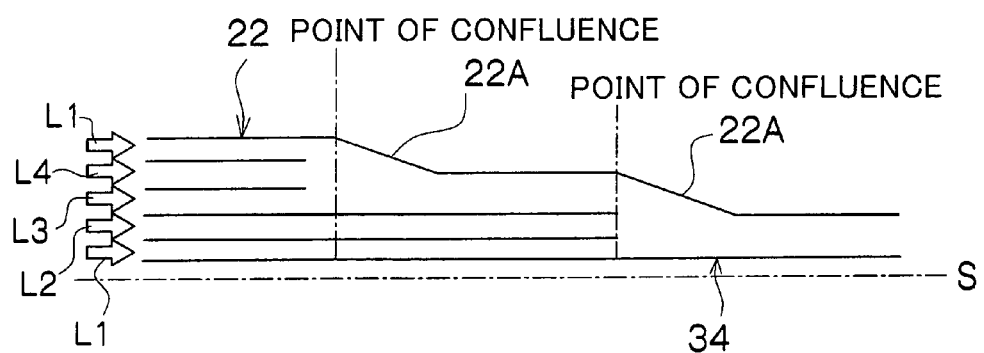

FIG. 9A and FIG. 9B show a case where among five fluid supply routes, in order from the innermost fluid supply routes, the fluid L1 not participating in the reaction, the extraction fluid L2, the fluid L3 participating in the reaction, the fluid L4 participating in the reaction, and the fluid L1 not participating in the reaction are supplied. Because in this manner, apart from the layers of the fluids L3, 14 participating in the reaction, the layer of the extraction fluid L2 for the extraction and separation of reaction products is formed, it is possible to efficiently extract and separate reaction products into the layer of the extraction fluid L2. In this case, it is desirable to combine a multistage reaction and multistage contraction. That is, as shown in FIG. 9B, the reaction is caused to occur by causing the fluids L3, L4 participating in the reaction to flow together, and when reaction products have been formed to a certain degree, the reaction products are extracted and separated by causing the extraction fluid L2 to flow together with the fluids L3, L4. In this case, because the laminar flows of the flows L1, L2, L3, L4 do not lose their shapes, the reaction products can be efficiently separated by separating and taking out only the layer of the extraction fluid L2 after the extraction and separation of the reaction products. Furthermore, because by contracting the flows near the point of confluence where the fluids L3, L4 flow together and near the point of confluence where the extraction fluid L2 flows together with the fluids L3, L4, the thickness of the fluids after the confluence can be kept thin, it is possible to promote the reaction.

Incidentally, although the embodiments of a reaction method of the present invention were described by using examples of 2 fluid supply routes-2 kinds of fluids, 3 fluid supply routes-3 kinds of fluids, 4 fluid supply routes-4 kinds of fluids, 4 fluid supply routes-3 kinds of fluids, 6 fluid supply routes-3 kinds of fluids, and 5 fluid supply routes-4 kinds of fluids, it is possible to freely set the number of fluid supply routes and the number and kinds of fluids with respect to the number of fluid supply routes.

EXAMPLES

Example 1

In this example, by use of a microreactor provided with four fluid supply routes which are formed as a multicylindrical structure having a co-axis, a reaction which involves the generation of fine particles silver chloride (AgCl) was caused to occur. Among four fluid supply routes, the innermost fluid supply route which comes into contact with the inner peripheral wall surface and outer peripheral wall surface of the reaction channel 56 and the outermost fluid supply route were each supplied with distilled water as a fluid not participating in the reaction, the second fluid supply route from the inside was supplied with a silver nitrate fluid ($AgNO_3$), and the third fluid supply route from the inside was supplied with a sodium chloride fluid (NaCl). The opening width of the reaction channel 56 was 225 μm.

In the experiment, 0.05 mol/l of silver nitrate fluid and 0.05 mol/l of sodium chloride fluid were used, and each fluid was caused to contain 0.06 wt % low molecular weight gelatin with a molecular weight of about 20,000 as a protective colloid during the formation of fine particles. The fluid temperature was 296±1 K as absolute temperature (23±1° C.) as centigrade temperature. And with the flow rate Q (ml/minute) of the silver nitrate fluid and the flow rate Q (ml/minute) of the sodium chloride fluid kept equal, a pressure increase in the microreactor with respect to elapsed time after the start of operation was investigated for the three levels of flow rate Q of 1.0 (ml/minute), 2.0 (ml/minute) and 3.0 (ml/minute).

On the other hand, as a comparative example, by use of a single mixer made by IMM of Germany (made of silicon, interdigital groove width 50 μm) an experiment was conducted under the same conditions as the example of the present invention, with the exception that distilled water was not used.

Both in the example of the invention and the comparative example, a pressure gauge was installed in the piping between a fluid supply route of the microreactor and a pump which feeds liquids to the fluid supply route, and changes in pressure were investigated. The result of the investigation is shown in FIG. 10.

Figure 10:
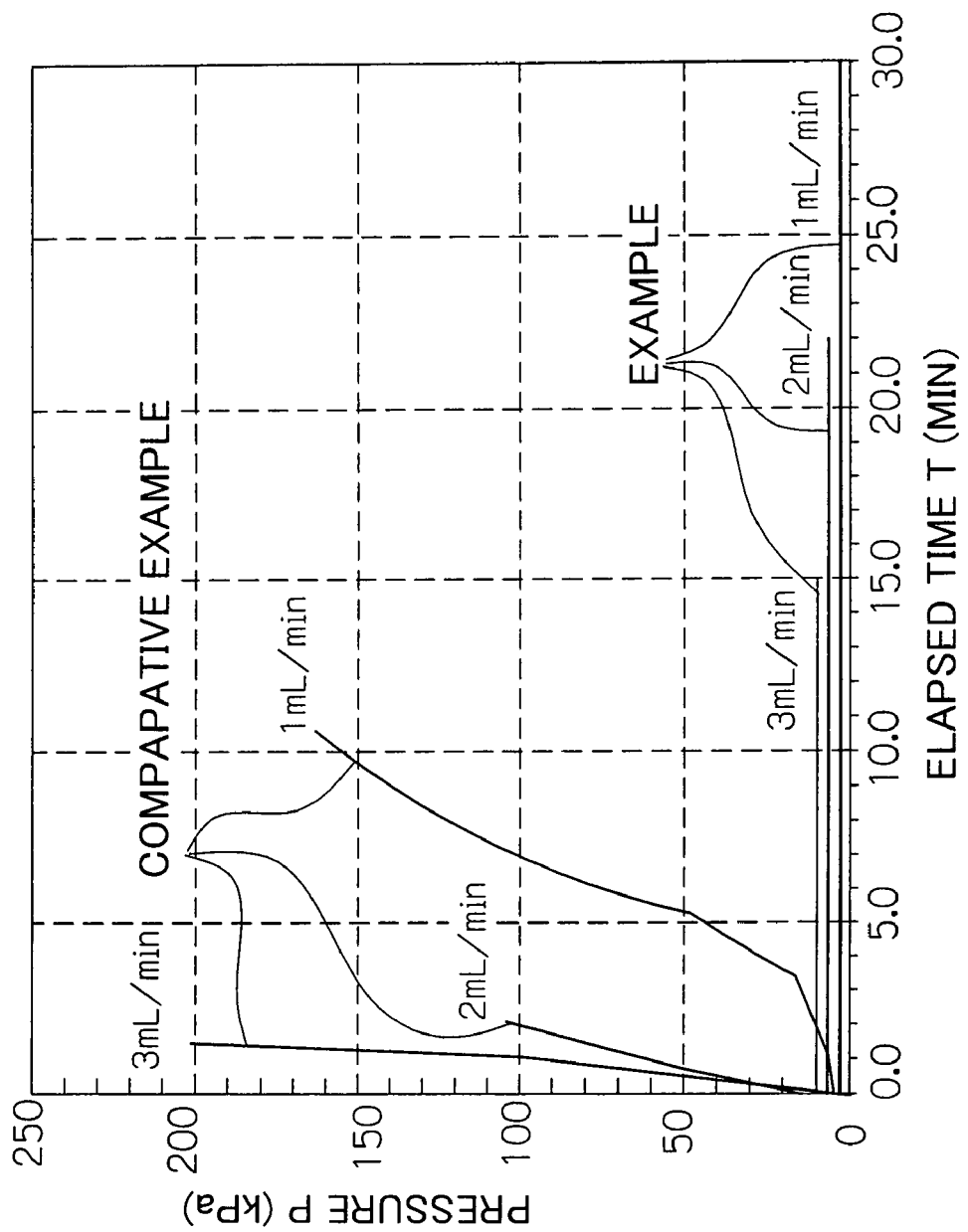
FIG. 10 is an explanatory view of an embodiment of a reaction method using a microreactor of the present invention.

As is apparent from FIG. 10, in the comparative example, the pressure rose abruptly to about 200 (kPa) in 1 minute and 30 seconds after the start of operation when the flow rate Q was 3.0 (ml/minute) and the pressure rose to about 100 (kPa) in 2 minutes after the start of operation when the flow rate Q was 2.0 (ml/minute). When the flow rate Q was 1.0 (ml/minute), the pressure rise became somewhat slow. However, in about 4 minutes after the start of operation, the pressure began to rise abruptly and exceeded about 150 (kPa) in 10 minutes after the start of operation. In this manner, when the reaction involves the formation of fine particles of silver chloride (AgCl), the fine particles are apt to adhere to the wall surface of the reaction channel and be deposited on the wall surface, with the result that the reaction channel will be clogged in a short time.

In contrast to this, in the example of the present invention, the pressure measured for 15 minutes after the start of operation was constant at 10 (kPa) when the flow rate Q was 3.0 (ml/minute), the pressure measured for 22 minutes after the start of operation was constant at 7 (kPa) when the flow rate Q was 2.0 (ml/minute), and the pressure measured for 30 minutes after the start of operation scarcely showed any rise when the flow rate Q was 1.0 (ml/minute). Because in this manner by carrying out a reaction method using a microreactor of the present invention, it is ensured that fine particles generated by the reaction do not adhere to the wall surface of the reaction channel 56, the reaction channel will not be blocked by clogging. As a result of this, it is possible to minimize troubles and the frequency of disassembly cleaning due to clogging.

Incidentally, though not shown in the drawing, a reaction which involves the generation of fine particles of silver chloride (AgCl) was conducted by use of a microreactor provided with two fluid supply routes which are formed as a multicylindrical structure having a co-axis. In this case, distilled water not participating in the reaction was not used because of the use of the two fluid supply routes. As a result, downstream of the reaction channel 56 the adhering of fine particles to the wall surface of the reaction channel became conspicuous and the pressure increase as a function of treatment time showed a result intermediate between that of the example of the invention and that of the comparative example. As a result of this case, the effect of the forming of the fluid supply routes as a multicylindrical structure having a co-axis on the prevention of clogging was also ascertained. It might be thought that this is because the forming of the fluid supply routes in a cylindrical shape eliminates the presence of corner portions which are due to rectangular fluid supply routes as in a conventional microreactor, with the result that the adhering of fine particles in corner portions does not occur. Therefore, the best multicylindrical structure of a fluid supply route is a structure of multiple circular cylinders, and in the case of a structure of multiple polyangular cylinders, the closer to a circular shape, the more desirable.

Example 2

Example of a Reaction Using Fluorine Gas

In this example of the present invention, a fluorination reaction was caused to occur by use of a stainless steel microreactor as shown in FIG. 6, which is provided with four fluid supply routes formed as a multicylindrical structure having a co-axis (opening width of the reaction channel 56: 225 μm).

A cooling medium at −20° C. was circulated as the heat medium C1 shown in FIGS. 2A and 2B in order to control the reaction temperature, and perfluorohexane which is a solvent not participating in the reaction was caused to flow as the fluid L1 of FIG. 6. Next, 10 vol. % fluorine gas in nitrogen was caused to flow (10 ml/minute) as the fluid L2, and ethyl acetoacetate diluted with F-113 (1,1,2-richloro-trifluoroethane) (concentration: 10 wt. %) was caused to flow as the fluid L3 at a flow rate of 5 ml/h.

When a reaction liquid thus obtained was analyzed by use of high-speed liquid chromatography, it was found that 2-ethyl fluoroacetoacetate had been obtained at a conversion yield of 85% and a selectivity of 97%. The generation of 2,2-ethyl difluoroacetoacetate which is formed in a not negligible amount in a conventional flask reaction was small and not more than 3%.

Furthermore, because fluorine gas does not come into contact with the apparatus, the corrosion of the apparatus was scarcely observed.

Example 3

Example of Synthesis of Organic Pigment

In this example of the present invention, a reaction to synthesize an organic pigment of the following reaction formula was caused to occur by use of a stainless steel microreactor as shown in FIG. 8, which is provided with six fluid supply routes formed as a multicylindrical structure having a co-axis (opening width of the reaction channel 56: 300 μm).

[Formula 1]

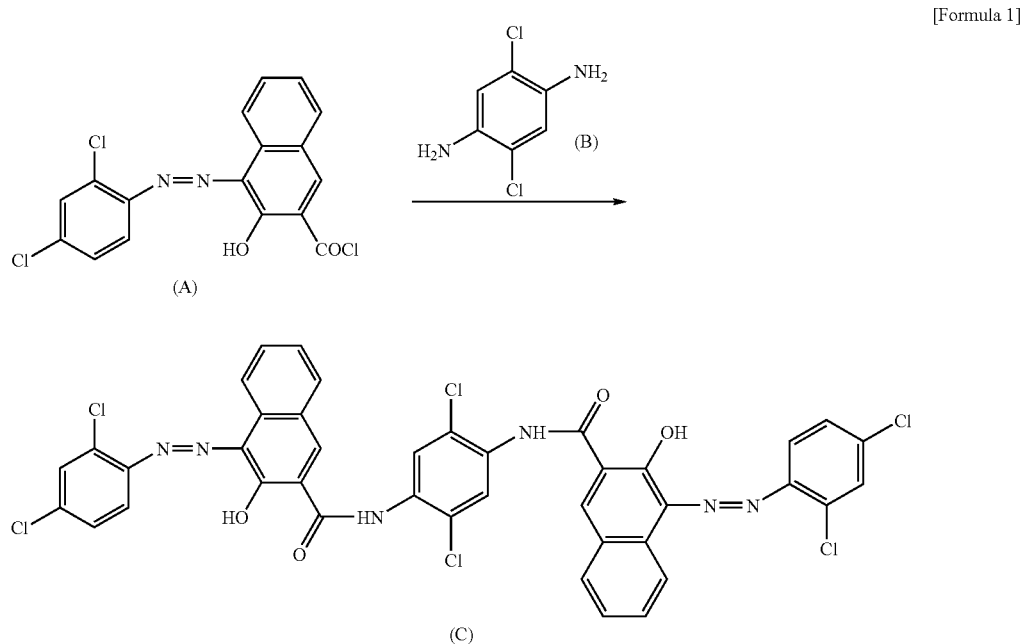

Silicon oil heated to 180° C. was circulated as the heat medium C1 shown in FIGS. 1A and 1B in order to control the reaction temperature, and 1,2-dichlorobenzene which is a solvent at 80° C. was caused to flow as the fluid L1 of FIG. 8. Next, as the fluid L2 of FIG. 8, a solution obtained by causing 37.9 g (0.1 mol) of the above compound (A) to be suspended in 300 ml of 1,2-dichlorobenzene at 80° C. was dissolved in 300 ml of 1,2-dichlorobenzene and heated to 80° C., and this solution was caused to flow each time at a flow rate of 6 ml/minute by use of a piston pump.

When a suspension of a pigment (C) of the above compound was analyzed, the purity was not less than 95%. The phenomenon that a flow channel is clogged was not observed.

Example 4

Example of Synthesis of Organic Silver Salt

In this example of the present invention, a reaction to synthesize an organic silver salt was caused to occur by use of a stainless steel microreactor as shown in FIG. 6, which is provided with four fluid supply routes formed as a multicylindrical structure having a co-axis (opening width of the reaction channel 56: 300 μm).

Water at 35° C. was circulated as the heat medium C1 shown in FIGS. 1A and 1B in order to control the reaction temperature, and distilled water at 35° C. was circulated as the fluid L1 of FIG. 6. Next, as the fluid L1 of FIG. 6, an aqueous solution of fatty acid sodium containing behenic acid as a main component held at 75° C. (prepared by mixing 2.6 moles of fatty acid with 4.2 l of distilled water, 500 ml of an aqueous solution of NaOH with a concentration of 5 mol/l and 1.2 l of t-butanol and stirring the mixture at 75° C. for 1 hour) and an aqueous solution of silver nitrate held at 75° C. as the fluid L3 (an aqueous solution obtained by dissolving 400 g of silver nitrite in stilled water so that the volume becomes 2.1 l, pH 4.0) were caused to flow each at a flow rate of 10 ml/minute by use of a piston pump.

An organic silver dispersion liquid thus obtained LM was considerably stable. The phenomenon that a flow channel is clogged was not observed in the reaction.

What is claimed is:

1. A reaction method comprising
   flowing fluids through a microreactor,
   coaxially laminating the fluids and causing the fluids to flow as laminar flows whose sections orthogonal to the co-axis are annular, and
   reacting the fluids by diffusing the fluids in a normal direction of contact interfaces of the fluids,
   wherein the microreactor has a plurality of fluid supply routes in communication with one reaction channel as a multicylindrical structure having a co-axis and causes a plurality of fluids to flow together in the reaction channel via the respective fluid supply routes,
   wherein among said plurality of laminated fluids, at least one fluid is a fluid not participating in the reaction of other fluids and
   wherein the cross-sectional thickness of said fluids participating in the reaction is varied by increasing or decreasing the flow rate of said fluid not participating in the reaction.

2. The reaction method according to claim 1, wherein an opening width of said reaction channel is not less than 1 μm but not more than 1000 μm.

3. The reaction method according to claim 1, wherein said laminated laminar flows are constituted by 3 or more kinds of fluids and, among these fluids, between the laminar flows formed by the fluids participating in the reaction is sandwiched a laminar flow of said fluid not participating in the reaction.

4. The reaction method to claim 1, wherein said laminated laminar flows are constituted by 3 or more kinds of fluids and, among these fluids, said fluid not participating in the reaction is used as a fluid in contact with a wall surface of said reaction channel.

5. The reaction method according to claim 1, wherein said laminated laminar flows are constituted by 3 or more kinds of fluids and, among these fluids, the fluids participating in the reaction form regular annular laminar flows.

6. The reaction method according to claim 1, wherein said fluid not participating in the reaction is a solvent component of said fluids participating in the reaction.

7. The reaction method according claim 1, wherein said laminated laminar flows are constituted by 3 or more kinds of fluids and, among these fluids, apart from layers formed by the fluids participating in the reaction, a layer for an extraction fluid for extracting and separating reaction products of the reaction is formed, and a desired reaction product formed by the reaction is extracted and separated by said extraction fluid.

8. The reaction method according to claim 1, wherein in each of the fluid supply routes formed in the multicylindrical structure of said co-axis, a plurality of fluid supply ports are arranged at equal intervals in a circumferential direction of said multicylindrical structure.

9. The reaction method according to claim 1, wherein the reaction temperature of fluids flowing in said reaction channel is controlled.

* * * * *